Jan. 16, 1968    D. E. LOVELACE ET AL    3,363,471
ACCELEROMETER
Filed June 25, 1964    2 Sheets-Sheet 1
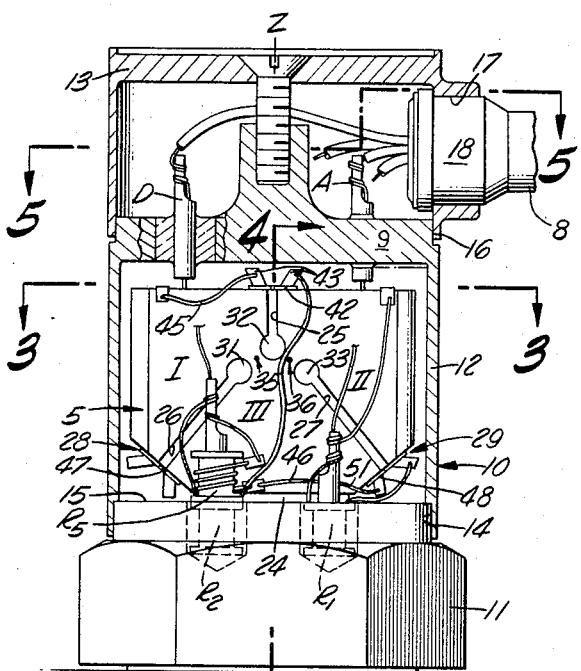
FIG.2.
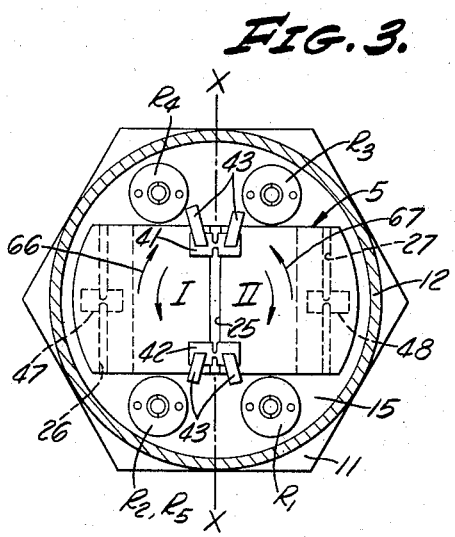
FIG.3.
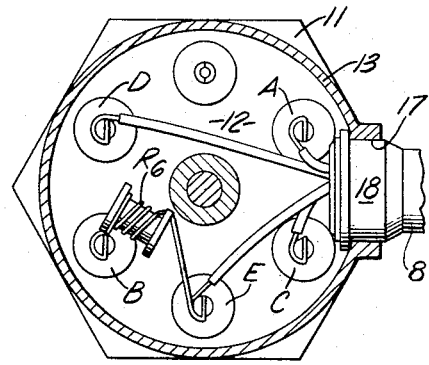
FIG.5.
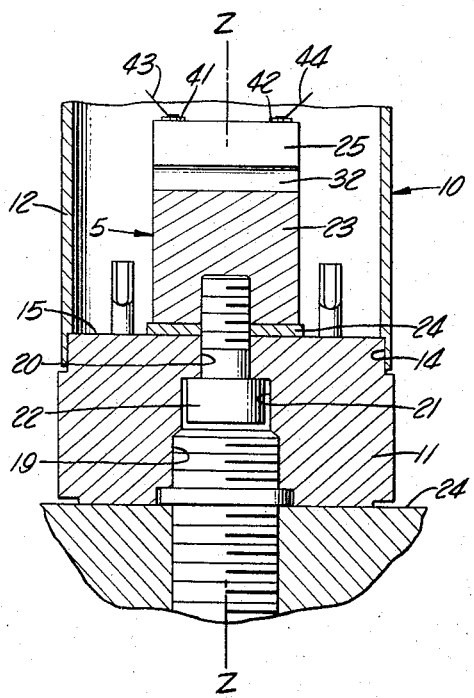
FIG.4.
FIG.1.
DONALD E. LOVELACE
BERNARD A. SHOOR
INVENTORS.
BY Reed C. Lawlor
ATTORNEY Jan. 16, 1968  D. E. LOVELACE ET AL  3,363,471
ACCELEROMETER
Filed June 25, 1964
2 Sheets-Sheet 2

DONALD E. LOVELACE
BERNARD A. SHOOR
INVENTORS.

BY Reed C. Lawlor
ATTORNEY

United States Patent Office 3,363,471
Patented Jan. 16, 1968

3,363,471
ACCELEROMETER
Donald E. Lovelace, Pasadena, and Bernard A. Shoor, Los Angeles, Calif., assignors, by mesne assignments, to Endevco Corporation, a corporation of California
Filed June 25, 1964, Ser. No. 377,984
22 Claims. (Cl. 73—517)

This invention relates to an improved accelerometer and more particularly to a novel mass structure, and to a novel arrangement for detecting relative movements of the inertia member of the mass structure relative to the case or base of the accelerometer.

In measuring the motions of objects and the stresses that exist in them, it is desirable to measure acceleration of the object and the acceleration of various parts thereof. In general, three principal types of systems have been employed in the prior art to measure acceleration. In all such systems, it is desirable to produce a signal which varies with acceleration in the same proportion regardless of frequency, over a wide range of frequencies. In other words, the amplitude or magnitude of the signal should vary as a function of time in the same manner as acceleration varies as a function of time over such frequency range. In this way a record of the manner in which the signal varies constitutes a record of how the acceleration varies.

In one type of prior art acceleration measuring system, an inertia member is resiliently suspended relative to a case or base member, which is rigidly secured to an object under investigation. A coil and magnet are mounted on the inertia member and the case respectively, or vice-versa, and the voltage induced in the coil as it moves relative to the magnet is detected. With such a system, it is impossible to measure a steady acceleration because, when the instrument is subjected to a steady acceleration, the inertia member remains in a fixed position relative to the case and no voltage is induced in the coil no matter what the value of the acceleration may be. Furthermore, in measuring oscillatory acceleration at various frequencies with such a device, the voltage developed in the coil is proportional to the relative velocity of the inertia member and the base, thus requiring the use of a differentiating circuit to produce a signal proportional to acceleration, regardless of frequency.

In prior art accelerometers of a second type which have been employed heretofore but which are free of the objections mentioned above, a piezoelectric crystal is mounted between a base member and an inertia member. In this case, the charge developed on the piezoelectric element is employed to indicate the acceleration. This is usually done by means of a circuit which measures the voltage developed across the faces of the piezoelectric element. In some cases, the total charge is measured with a charge amplifier as taught by the Robert H. Cother Patent No. 3,130,329. Such accelerometers have the same response over a wide frequency range. But, regardless of whether it is the voltage that is measured, or the charge, such accelerometers are also incapable of measuring steady acceleration. The reason for this is that the charge gradually leaks off and the voltage drops to zero when the accelerometer is subjected to a steady acceleration.

In a third type of accelerometer that is useful both in measuring steady acceleration and in measuring oscillatory acceleration, a wire strain gauge is mechanically connected, under tension, between the inertia member and the base member to sense the relative displacement thereof. Such displacement is proportional to acceleration over a wide frequency range below the resonant frequency of the accelerometer and this frequency range extends down to 0 c.p.s., that is, to steady accelerations. In this case, the wire strain gauge element is electrically connected in a bridge or other electrical circuit which detects and measures a change in resistance occurring in the strain gauge element in response to the acceleration. Inasmuch as this resistance change depends upon the change in length of the strain gauge element and this change is proportional to acceleration, measurements of this type may be employed to measure steady accelerations as well as oscillatory or vibratory accelerations.

In the best embodiment of this invention now known, an improved accelerometer is provided which can be employed for measuring both steady accelerations and oscillatory accelerations and which is responsive to components of acceleration along only a single axis. In this invention, use is made of an improved mass structure that characterizes the invention and also an improved arrangement of strain gauge elements.

In all such prior art accelerometers known to us, the acceleration is measured by means of a device which is responsive to the relative movement of a single mass or inertia member relative to a base member. The present invention utilizes an entirely different type of mass structure.

More particularly, in accordance with the present invention, an accelerometer utilizes a pair of laterally extending wing-type mass elements that are each resiliently mounted for independent angular movement on a common base or reference structure. Means are provided for detecting the relative displacement of the wing-type mass elements relative to each other as well as relative to the base. This is accomplished by employing a pair of strain gauge elements to detect the relative displacement of the wings from each other and another pair to detect the relative displacement of each wing relative to the base member.

Furthermore, in accordance with this invention, the mass structure is so shaped, and the strain gauge elements are so arranged thereon, as to render the accelerometer responsive to rectilinear acceleration along a single axis only. The accelerometer of this invention is insensitive to linear accelerations along other axes and is also insensitive to angular, or rotational, accelerations. Additionally, it is relatively insensitive to thermal shock and to bending of the base. Furthermore, because the base member is of wedge or other tapered configuration, with the lateral inertial members attached to its apex, and its broad base surface attached to the object undergoing test, the frequency response is determined entirely by the resonant frequencies of the inertia members relative to the base, and the resonant properties of the base and housing structure have little effect on the response.

The strain gauge elements that are employed in the best embodiment of the invention are composed of piezo-resistive material and are of hourglass configuration. Such strain gauge elements are described in detail and claimed in the co-pending U.S. patent application Ser. No. 364,673, which was filed May 4, 1964, by Leslie B. Wilner and assigned to the same assignee as this application. Such a strain gauge element is characterized by a higher change of resistance with strain than ordinary unbonded wire-type strain gauge elements, partly because of the fact that the strain is confined to a short narrow neck portion of the strain gauge element and partly because of the use of piezoresistive material. By employing such strain gauge elements with the mass structure of this invention, it becomes possible to extend the range of frequencies to which accelerations can be made with uniform sensitivity.

Thus, in accordance with this invention, an accelerometer is provided which is not only capable of measuring steady accelerations, but which is also capable of measuring oscillatory accelerations to higher frequencies than heretofore.

The foregoing and other features of this invention, together with the various advantages thereof, will become more clear from the following specification taken in connection with the accompanying drawings in which:

In the drawings:

FIG. 1 is an isometric view of a mass structure in accordance with this invention;

FIG. 2 is a partially cut-away view of an embodiment of the accelerometer according to this invention;

FIG. 3 is a partially sectional top-plan view of the accelerometer with the section taken through 3—3 of FIG. 2 to show interior features thereof;

FIG. 4 is a cross section through a portion of the accelerometer shown in FIG. 1 taken in a plane 4—4 of FIG. 2 thereof;

FIG. 5 is a top view partially in section taken through the plane 5—5 of FIG. 2 showing the connection terminals and components of the bridge circuit associated with the accelerometer;

Figure 8:
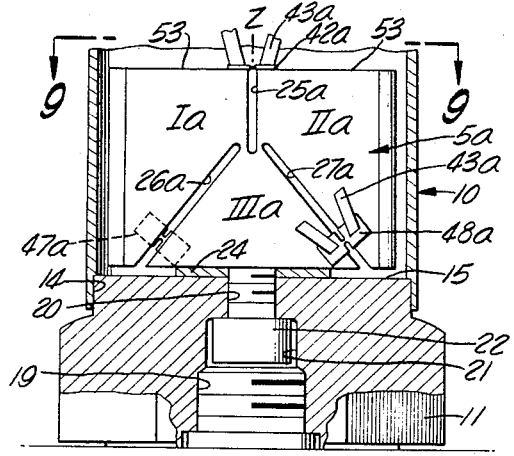
FIG. 8 is a fragmentary view similar to that of FIG. 2 showing another embodiment of the invention.

In one specific design of accelerometer of this invention, the accelerometer employs a mass structure 5 as illustrated in FIG. 1 mounted with other elements in a housing 10 as illustrated in FIGS. 2, 3, 4, 5, and 7. The mass structure 5 is formed from a solid block of material wider than it is high and about one-third as thick as it is wide. A suitable material for the mass 5 may be tungsten alloy or other dimensionally stable solid substance of high density. The three principal axes of mass structure 5 have been identified in FIG. 1, with the X axis taken through the width, the Y axis through the thickness, and the Z axis through the height. The accelerometer, which is symmetrical about the vertical plane Y-Z, is almost exclusively responsive to acceleration along the Z axis.

The mass structure 5 includes a pair of lateral wing elements, or wings, I and II that act as inertia members and a vertical wedge-shaped base member or supporting element III. The wing elements I and II pivot about what amounts to a pair of hinge axes 35 and 36 (see FIG. 7) extending in parallel along the Y axis of the accelerometer. The wing elements articulate about the hinge axes in response to vertical accelerations along the Z axis. The resulting articulations of the wing elements are in the form of rotational motions in the X-Z plane, about the Y axis. A downward thrust of the accelerometer produces a relative separation or pull of the base support from the wings and moves the upper part of the wings together and an upward thrust produces a motion of the base support toward each of the wings and moves the upper parts of the wings apart.

Though they may be separate and formed other ways, in the mass structure illustrated, the three elements I, II, and III are formed from a single generally rectangular mass by cutting slots 26 and 27 parallel to the Y axis across the width of the mass structure diagonally upwardly from the base corners, at identical but opposite angles, towards a central point of the mass. A third slot 25 is cut parallel to the Y axis and downward in the center. The inner ends of the three slots define flexural members that hinge the inertial wing members I and II on the base III.

The cuts 26 and 27 extend upwardly from the lower outer corners towards the center of mass structure 5 to points equidistant from the end of cut 25. The corners 28 and 29 are cut to form external surfaces perpendicular to the lines of the cuts 26 and 27 respectively. The lengths of the cuts 26 and 27 are each about twice the length of the cut 25, when the corners 28 and 29 have been cut away to form chamfered corners as shown.

In one embodiment of the accelerometer, at each of the points where the slots terminate within the mass, a circular hole, or bay, is drilled to provide stress relief. The three holes are of the same diameter and form a triangle in the upper center of the mass with the apex at the top. The three slots all have the same thickness $d$.

It is to be noted that the center lines of the diagonal cuts 26 and 27 extend through the aperture 32 at the bottom of the center cut 25, thus forming two resilient or flexure members hingedly supporting the mass members I and II for rotation about the axes 35 and 36 parallel to the Y axis. This arrangement causes the axes P of the arms of the flexures to extend at angles of about 45° relative to the X axis. The rotation axis 35 lies midway between the centers of apertures 32 and 31 and the rotation axis 36 lies midway between the centers of apertures 32 and 33 (see FIG. 7). The respective centers of mass identified at 37 and 38 of wings I and II articulate about the hinge axes 35 and 36 as indicated by double arcuate arrows 39 and 40. The wing members I and II are so shaped and proportioned that their centers of mass 37 and 38 lie on a plane 34 that extends through the hinge axes 35 and 36. The entire construction is symmetrical about the vertical plane Y–Z.

As shown in FIGS. 2 and 3, this accelerometer employs four piezoresistive strain gauge elements of the type described and claimed in the above identified co-pending application. The respective strain gauge elements 47 and 48 are mounted across the centers of each of the respective diagonal slots 26 and 27 coupling the base support III to the respective wing mass elements I and II. Thus, each wing has a strain gauge element at the bottom joining it to the base member across the middle of the intervening slot. The tops of the two wings I and II are joined by two strain gauge elements 41 and 42 at the ends of the top of the vertical slot.

With reference particularly to FIG. 3, it is seen that strain gauge elements 41 and 42 are mounted at the front and rear ends of cut 25 between the mass elements I and II. Strain gauge elements 47 and 48 are respectively positioned across cuts 26 and 27 at the centers thereof on the chamfered corner surfaces 28 and 29.

Figure 7:
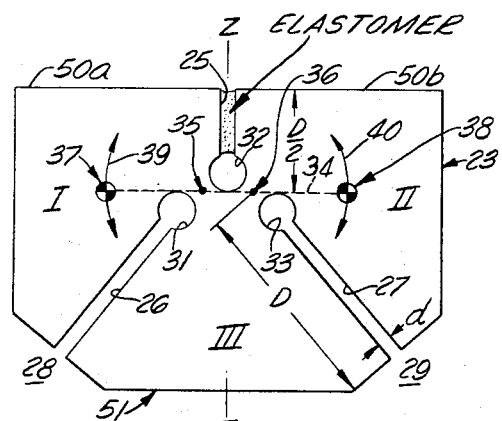
FIG. 7 is a side elevation of a typical mass structure employed in the invention.

The distance D of each of two lower strain gauge elements 47 and 48 from the corresponding axes 26 and 27 of rotation of the respective wings is twice the distance D/2 that each of the upper strain gauge elements is from the common plane 34 drawn through the hinge axes 35 and 36 as indicated in FIG. 7. With this arrangement, forces of equal magnitude are applied to the four strain gauge elements, two of the gauges being under compression and two under tension, at any one time. The torsion constants of the strain gauge elements acting on each wing about the hinge axes is much greater than the torsion constants of the respective flexures. For this reason the resonant frequency of the vibrating system that includes each of the wings is determined by the moment of inertia of the wing about the hinge axis and the spring constant, or stiffness, of the strain gauges along their strain axes Q—Q (see FIG. 10).

Downward motion of the accelerometer causes the two wings to rotate toward each other at their top ends and away from the base at their lower ends, producing a compressional force upon the top strain gauge elements 41 and 42 and a tensional stress upon the respective lower strain gauge elements 46 and 47. Upward motion or acceleration of the accelerometer produces a compressional force upon the lower strain gauge elements 46 and 47 and tensional stress on the two upper strain gauge elements 41 and 42. Extension of a strain gauge element increases its resistance. Compression of a strain gauge element decreases its resistance.

As have been described in the above mentioned co-pending application, the piezoresistive strain gauge elements are of a novel shape and construction due to which a high output is obtained for a given stress or strain with greater linearity over a wider range than is achieved with strain gauge elements heretofore. These piezoresistive strain gauge elements respond to either compression or tension forces even though they are not subjected to prestressing forces as is necessary with unbonded wire-type strain gauge elements. Further advantages of the above mentioned piezoresistive strain gauge elements are found in their high sensitivity and their ability to respond to and measure low levels of stress or strain in the object undergoing test.

In combination with the new piezoresistive strain gauge elements of the above mentioned co-pending application, the mass structure of the present invention can perform many acceleration detection and measurement tasks previously considered not feasible and can do so over a wider range of frequency and with a high degree of linearity over a greater range of acceleration amplitudes. Further advantages of the present invention lie in the fact that accelerometers of smaller physical size can be constructed, thereby reducing the weight and size of the accelerometers.

The housing 10 is made up of a base 11, a cylindrical cover 12, and a terminal outlet and cap assembly 13. An undercut 14 in the inner bottom surface of cover 12 provides a tight fit of cover 12 over a circular base extension or platform 15 on top of base 11. The top outer diameter 16 of cover 12 is undercut to receive cap assembly 13. An aperture 17 is cut in the side of cap assembly 13 to receive a cable terminal 18. Insulated terminals A, B, C, D, and E are mounted in the cap plate 9 of the cover 12 to provide connections between the conductors of the cable 8 and electrical elements of the accelerometer.

In the bottom of base 11 there is provided a central threaded bore 19 which terminates at the upper end with a hole 20 and counterbore 21. The counterbore 21 is smaller in diameter than the threaded bore 19 and the hole 20 is smaller in diameter than counterbore 21. Hole 20 and counterbore 21 are designed to receive a screw 22 to hold the mass structure 5 of this invention in place on base 11. A washer 24 which is sometimes of a wedge configuration as further described below, is generally inserted between the bottom of mass 5 and base 11. The threaded bore 19 is provided in base 11 so that the accelerometer base 11 may be mounted rigidly on a surface such as 24 for acceleration measurement or sensing the motions of surface 24 along the axis Z—Z.

Figure 6:
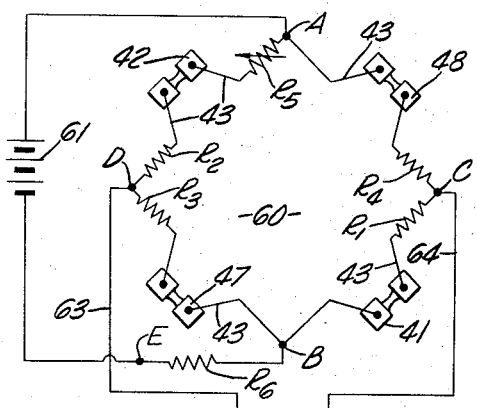
FIG. 6 is a schematic circuit and block diagram of the electrical bridge interconnections of the piezoresistive strain gauge elements and recorder employed in an implementation of the invention.

In FIG. 6, a schematic circuit diagram is shown for measuring the acceleration detected by the strain gauge elements. The four strain gauge elements 41, 42, 47, and 48 are connected together in a Wheatstone bridge which is employed to produce the desired acceleration-indicating signal in accordance with the changes in resistance produced in the strain gauges by the acceleration.

The two strain gauge elements 41 and 42 that are mounted across the end of the slot 25 are respectively arranged in one pair of the opposite arms of the bridge circuit 60 and the two strain gauge elements 47 and 48 that are mounted across the ends of the slots 26 and 27 are respectively arranged in the other pair of opposite arms of the bridge circuit. A resistor R1 is mounted in the same arm as the strain gauge element 41 in series therewith and a resistance R2 is mounted in the same arm as the strain gauge element 42 in series therewith. The resistor R3 is arranged in series with the strain gauge element 47 in the same arm of the bridge, and resistor R4 is arranged in series with the strain gauge element 48 in the same arm of the bridge. The resistors R1, R2, R3, and R4 are of fixed value. The resistor R5 is adjustable and is employed for adjusting the degree of unbalance of the bridge.

The values of the resistors R1, R2, R3, and R4 are so chosen in relation to the temperature coefficient of sensitivity of the strain gauge elements as to cause the voltages across the strain gauge elements to increase when their sensitivity decreases, thus, largely rendering the accelerometer insensitive to temperature changes.

A driving potential source 61 is connected to the bridge input on one diagonal A–B. The source may supply either AC or DC voltage to the bridge as desired. The junction of resistor R5 and gauge element 48 forms one input terminal A and the junction of strain gauge elements 41 and 47 forms the other input terminal B thereof. A resistor R6 is connected in series with source 61 to the junction B. The output of bridge 60 is taken across the other diagonal C–D. The junction C is between resistors R1 and R4. The junction D lies between resistors R2 and R3. Lines 63 and 64 connect the output diagonal C–D of bridge 60 to a suitable recorder 62 which may be used to record, as a function of time, the variation in output of the acceleration being sensed and measured. While a recorder is shown at 62, any one of many other indicating or display instruments may be used as is well known to those skilled in this art.

Figure 10:
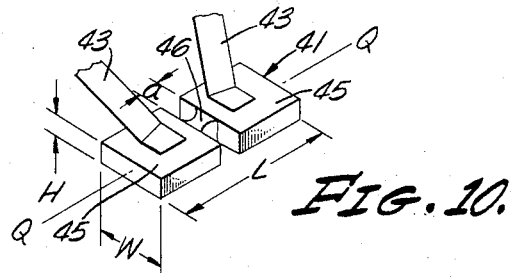
FIG. 10 is an isometric view of one of the strain gauge elements employed in one form of the invention.

In FIG. 10, a strain gauge element, such as 41, described in the above identified co-pending application is shown. This element is in the form of a very small elongated block of semi-conductive material having a reduced neck 46 of smooth hourglass configuration separating two enlarged pads 45 and having a pair of electrical leads 43 conductively bonded to the pads. The strain gauge element illustrated in FIG. 10 is in the form of a rod or block of rectangular cross section. The element has an overall length L of 0.25 cm., overall width W of 0.13 cm., and a thickness of 0.028 cm. The pads 45 are of square cross section as viewed from the top, being about 0.13 cm. on each side. The reduced neck 46 separating pads 45 has a cross section of about 0.015 cm. x 0.015 cm., the smallest section having an area of about 0.0002 cm.$^2$. Neck 46 is very nearly of square cross section, but is slightly rounded at the edges by chemical etching. It is joined by outwardly flaring portions that connect neck 46 to pads 45 by means of smooth curves.

In effect, the portion of the strain gauge element such as 41 that lies between pads 45 is a short Euler column of smooth hourglass configuration that is free of any lateral support. The length $a$ of neck 46, that is, the distance between pads 45, is somewhat greater than the minimum thickness of neck 46 at its narrowest portion. In any event, in the embodiment of the invention illustrated, the length of neck 46 is less than that length (about three or four times the minimum thickness of the neck), which could result in buckling. Thus, the strain gauge element 41 constitutes an Euler column, though this is not always essential to the operation if prestressed strain gauge elements are employed.

In the embodiments of the invention illustrated in FIGS. 2 and 8, if longitudinal compressive forces are applied along the longitudinal axis Q—Q of strain gauge element 41, it would not bend or buckle, but would gradually enlarge or thicken at neck 46 until it is crushed. While buckling could occur if element 41 were of great length so that, in effect, the element would be a rod or bar, still the portion 46 of the element 41 between pads 45 could be considered as having the properties of an Euler column when viewed in terms of forces applied to the element at the portions of the pads nearest neck 46. The strain gauge element 41 is symmetrical about its central longitudinal or strain axis Q—Q, being symmetrical about two mutually perpendicular planes that pass therethrough. With this arrangement, the neck is concentric with the central axis and lies midway between the lateral edges and surfaces of pads 45.

One advantage of employing a reduced neck that is non-buckling lies in the fact that the strain gauge element may be compressed up to the crushing point without buckling. This facilitates detection of compression-like strains as well as tension-like strains over a large range of strain forces without necessitating the prestressing of the strain gauge element with a static tension force. This, in effect, doubles the range of strain which can be measured compared with untensioned wire strain gauge elements.

An advantage of employing a short neck lies in the fact that the strain gauge element is stiff thus making it possible to cause the vibrating system that includes each wing member to have a high natural or resonant frequency. This makes it possible to measure acceleration with a uniform response up to a high frequency such as 2600 cps.

While it is not necessary to prestress the strain gauge elements, in practice a certain amount of prestressing occurs partly because the strain gauge elements are cemented in place by the application of non-conductive epoxy cement at an elevated temperature and partly because the material of the strain gauge elements has a lower, different temperature coefficient of expansion than the material of the mass members. In practice, the strain gauge elements are precompressed by as much as one-third to one-half of the full scale tensile load which they can withstand. By virtue of the fact that they can withstand greater loads under compression than under tension, this slight precompression actually increases the maximum amplitude of oscillatory acceleration which can be detected.

When the two inertia elements I and II are displaced toward or away from each other, the change in spacing is communicated to the reduced necks 46 of the respective strain gauge elements. As a result, the neck of each strain gauge element is strained in accordance with the change in spacing, each neck changing in both length and cross section. These changes are concentrated in the narrowest part of the neck where the resistance-per-unit length of the strain gauge has its highest value. In effect, the stubby hourglass configuration provides strain leverage, in that the strain in the narrowest portion of the neck is far greater than the strain would be if the thickness of the neck were uniform between the points of attachment to the wings Ia and IIa. This strain leverage increases the sensitivity of the strain gauge elements. By "sensitivity" is meant the fractional change in resistance ($\Delta R/R$) divided by the fractional change in thickness ($\Delta d/d$) of the slots 25, 26, and 27 adjacent the strain gauge elements. As a result of the high sensitivity achieved with this invention, high output can be obtained for a given displacement of the base support member III with respect to the wings I and II.

The four strain gauge elements 41, 42, 47 and 48 all have about the same mechanical properties. For this reason and by virtue of the fact that the two strain gauge elements bridge the vertical slot 25 and one strain gauge element bridges each of the other slots 26 and 27, and the spacing of the strain gauge elements relative to the hinge axes 35 and 36, all four strain gauge elements are subjected to the same stress and hence reach their tensile limit at about the same value of acceleration.

In a specific embodiment of the invention, the mass structure had a height of about 0.4", a width of about 0.5", and a thickness of about 0.25". The resonant frequency of each of the masses about its hinge element was about 13,000 cps. and the response of the accelerometer was uniform to within about 2% with negligible phase shift, from zero cps. to about 2,600 cps.

In this accelerometer, the wedge-shaped or other pyramidal or tapered structure of the base member, because of its shape, has a low Q preventing the base from exhibiting any detrimental resonant frequencies below the resonant frequencies of the vibration systems formed by the wing members and the strain gauges that support them in the mass structure.

Mechanical damping may be introduced if desired by placing a layer of viscous material such as grease or heavy oil in one or more of the slots, or by placing a sheet of elastomer material, such as neoprene in one of the slots as indicated in FIG. 7.

The accelerometer of this invention is sensitive only to components of acceleration along the Z axis. The manner in which the various parts of the accelerometer cooperate to render the accelerometer insensitive to components of acceleration along the Y axis and along the X axis and also render it insensitive to rotational accelerations is explained hereinbelow.

When the accelerometer is subjected to acceleration in a direction along the Z axis, the wing-shaped inertia elements I and II rotate about the hinge axes 35 and 36, causing the gaps 25, 26, and 27 to change in thickness in a corresponding manner. The thickness of gap 25 is opposite in sign to the changes in thicknesses of the gaps 26 and 27. As gap 25 increases in thickness by an amount $\Delta d$ at its end, gaps 26 and 27 decrease in thickness by an amount $\Delta d$ at their ends and vice-versa. As a result, the four strain gauge elements, 41, 42, 43, and 44 are strained in a corresponding manner and by equal amounts, thereby causing the degree of unbalance of the bridge 60 of FIG. 6 to be varied in a corresponding manner.

It will also be seen that any constant or steady upward or downward acceleration or deceleration of surface 24 will produce constant force conditions with respect to the compression and extension of strain gauge elements 41, 42, 47, and 48, so that a constant signal appears across the output diagonal of bridge 60 proportional to the constant acceleration. On the other hand, if the acceleration changes, the bridge output signal changes by a corresponding amount, increasing and decreasing along with the acceleration. Thus, the bridge circuit 60 produces an output signal corresponding in magnitude, frequency, and phase with the acceleration along the Z axis. As a result, the recorder or other display device 62 continuously indicates the instantaneous value of this acceleration as the acceleration varies and also indicates the magnitude of any steady component of the acceleration. Stated differently, as the acceleration along the Z axis varies as a function of time, a corresponding indication is produced in the display device 62 that also varies in a corresponding manner as a function of time.

But as the accelerometer is accelerated along the X axis, the wings I and II remain stationary relative to each other and to the support member III because of the fact that the centers of mass 37 and 38 of the wing members I and II respectively lie in a straight line that passes through the hinge axes 35 and 36 respectively. Thus, the accelerometer is insensiitve to vibration along the X axis.

When the accelerometer is subjected to acceleration along the Y axis, the two wing members I and II tend to rotate in the directions indicated by the arrows 66 and 67 of FIG. 3. In this case also, the output signal of the bridge circuit is zero. As the two wing members I and II rotate in opposite directions about the vertical or Z axis, the widths of the two diagonal slots 26 and 27 remain substantially constant at points midway of the ends of the slots where the strain gauge elements 47 and 48 are located, thus causing no change in the resistance of these gauges. Furthermore, one of the inertia members is displaced in a counter-clockwise direction, while the other is displaced in a clockwise direction, about the axis Z, causing one of the strain gauge elements 41 or 42 to be extended while the other is compressed. Since the strain gauge elements have the same elastic coefficient in compression as in extension, the resistance of one increases as the resistance of the other decreases by an equal amount. But since the two elements are in opposite arms of the bridge 60, the net result of this action is that the bridge output remains unchanged. Thus, the accelerometer is relatively insensitive to components of acceleration parallel to the Y axis.

To understand why the accelerometer of this invention is very insensitive to rotation about any axis, it is sufficient to consider the separate effects of rotation about the X, Y, and Z axes independently.

When rotation occurs about the Y axis, the motion of base III with respect to wings I and II is such that one of strain gauge elements 47 and 48 is compressed while the other is extended. Changes in resistance of the two strain gauge elements are equal and opposite. The resulting change in the bridge balance condition is nil because strain gauge element 47 and strain gauge element 48 are in opposite bridge arms. Also during rotational acceleration about the Y axis, wings I and II, in effect, move together and are thus stationary relative to each other. As a result, the slot 25 remains unchanged in width, causing no change in resistance of the two strain gauge elements 41 and 42, also causing no change in the bridge balance condition. Thus, the opposing resistance changes of strain gauge elements 47 and 48 and the absence of changes in strain gauge elements 41 and 42 result in no change in the balance of the bridge circuit. Consequently, for the conditions under which rotation of the accelerometer X axis occurs about the Y axis, there is no output from the bridge.

When the accelerometer rotates about the X axis, any strains that occur in the strain gauge elements are all very small and equal. As a result, the accelerometer is insensitive to rotation about the X axis.

It might appear at first that the accelerometer is sensitive to rotation about an axis parallel to the X axis but displaced therefrom some distance. For example, it might appear that the accelerometer is responsive to angular accelerations about such a displaced axis that extends through the base 11 of the accelerometer. Actually, the response produced under those conditions is due to the centripetal acceleration of the base along the Z axis. Such an acceleration is radial and linear, not angular. It is therefore proper to say that the accelerometer is not sensitive to components of angular acceleration about the X axis or any axis parallel thereto.

A situation similar to that described in connection with the rotation about the X axis also prevails when the accelerometer is rotated about the Z axis since, again, the strain gauge elements are not subjected to differential strains.

From the foregoing discussion, it is thus clear that the accelerometer illustrated in FIGS. 1, 2, 3, 4, 5, and 6 is sensitive only to the components of linear acceleration along the Z axis and is insensitive to angular acceleration about any axis whatsoever.

This accelerometer is also insensitive to bending forces that may be applied to the base 11 and which are communicated through the screw 20 and washer 24 to the base member III. Thus, if such bending forces are communicated to the base member III, causing the outer ends thereof to be spread apart, the inertia members I and II tend to move together at the upper end. Any resultant distortion strain caused by such bending action is divided equally among the four strain gauge elements 41, 42, 47, and 48. As a result, such bending forces produce no change in the output of the bridge. In a similar way, if a temperature change is transmitted through the base 11 to the base member III causing differential thermal expansion of different parts of the base member III, the resultant distortion also causes the strain to be divided equally among the four strain gauge elements, again not disturbing the output of the bridge.

Though the base member III is described as being formed as a solid piece cut from a solid block, it will be understood that this is not essential and that, in fact, in many applications, the base member III may be made hollow to reduce the total weight of the accelerometer.

Figure 9:
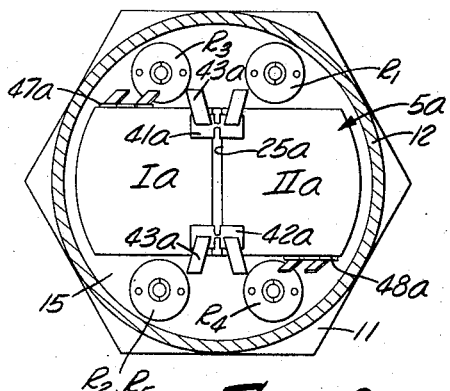
FIG. 9 is a partially sectional top-plan view of the embodiment of the accelerometer shown in FIG. 2, the section being taken through the plane 9—9 thereof.

In an alternative embodiment of the invention illustrated in FIGS. 8 and 9, a somewhat different mass structure 5a and a somewhat different arrangement of strain gauge elements is employed. Like mass structure 5, the mass structure 5a comprises two wing-shaped inertia elements Ia and IIa separated from each other by slot 25a, and separated from a base member IIIa by slots 26a and 27a, respectively. This mass structure 5a is of similar configuration to that previously described except that the lowermost corners are not chamfered, the slots 26a, 27a, and 25a are not provided with stress relief bores, and the upper slot 25a terminates between the two diagonal slots 26a and 27a. Two strain gauge elements 41a and 42a are located across the upper end of the slot 25a in the accelerometer of FIGS. 8 and 9 in a manner similar to the arrangement of the strain gauge elements 41 and 42 relative to the slot 25 of the accelerometer of FIGS. 2 and 3. But in this case, the strain gauge element 47a that bridges the slot 26a is cemented to a rear face of the mass structure 5a and the strain gauge element 48a that bridges the slot 27a is cemented to the front face of the mass structure 5a.

This embodiment of the invention is also selectively sensitive to accelerations along the Z axis. It is insensitive to accelerations along the X axis and along the Y axis and to angular accelerations about the X axis and the Y axis. However, it is somewhat sensitive to angular accelerations about the Z axis because of the fact that the strain gauge elements 47a and 48a are located on opposite faces of the mass structure instead of midway between these faces.

The accelerometer of this invention may have a residual sensitivity to components of acceleration along the Y axis due to slight imperfections in the circuitry or slight mismatches in the characteristics of the piezoresistive strain gauge elements. In practice, it is found that when the accelerometer is subjected to acceleration along the Y axis, there may be a small signal in the output of the bridge circuit 60. Such cross-axis sensitivity may be largely overcome and often completely eliminated by employing a wedge-shaped washer 24 having the planes of the wedges parallel to the X axis and tapering in one direction or the other in the direction of the Y axis.

From the above discussion it may be seen that only a condition of acceleration or deceleration along the Z axis will produce an appreciable output in bridge 60.

It will be understood that this invention is not limited to the details of the embodiments illustrated but that many variations may be made therein in accordance with the principles of the invention. More particularly, it will be understood that the mass structure may be made in different configurations and different proportions and may be composed of different materials from those specifically disclosed herein. Additionally, it will be understood that many of the advantages of this invention may be obtained without employing four strain gauge elements. More particularly, it will be understood that many of the advantages may be obtained even if only a single strain gauge element is mounted across the vertical slot between the lateral inertia members with or without strain gauge elements being mounted across the other slots. It will also be understood that acceleration may be detected with other types of strain sensitive elements. For example, wire strain gauge elements under tension may be bridged across the gaps or if desired electrically polarized piezoelectric elements sensitive to strain may be mounted within the gaps and cemented to the walls thereof.

It is thus seen that the invention provides an improved accelerometer which is sensitive to accelerations along a single predetermined axis and is insensitive to angular rotations and furthermore which can be employed to measure static accelerations as well as both low frequency and high frequency oscillatory accelerations over a wide range of frequencies.

The invention claimed is:

1. In an accelerometer:

a mass structure comprising a base member attachable to an object under investigation and a pair of inertia members mounted for rotation about corresponding hinge axes of said base member and adapted to rotate in opposite directions about said hinge axes when said base member is accelerated along a predetermined axis transverse to said axes, and acceleration detecting means comprising at least three force responsive sensors for detecting accelerations of said base member along said predetermined axis, each of said sensors having an electrical property which is a function of the magnitude of a force being applied between two spaced-apart portions of said each sensor, one of said sensors being connected between said two inertia members with said portions of said one sensor being firmly connected to said two inertia members respectively, whereby a force is applied to said one sensor in response to relative movement of said two inertia members relative to each other, each of the remaining sensors being connected between each of said inertia members respectively and said base member with said portions of each said remaining sensor being firmly connected respectively to the corresponding inertia member and said base member, whereby a force is applied to said each remaining sensor in response to relative movement of the corresponding inertia member and said base member.

2. An accelerometer as defined in claim 1 wherein said inertia members are symmetrically disposed relative to said predetermined axis.

3. An accelerometer as defined in claim 2 wherein the moments of inertia of said inertia members, and the elastic properties of the displacement sensors are such that said inertia members rotate by equal amounts in opposite directions as said base member is accelerated along said predetermined axis.

4. An accelerometer as defined in claim 2 wherein said base member is of tapered configuration and said inertia members are hingedly supported on said base member adjacent the apex thereof.

5. An acceleration measuring system comprising an accelerometer as defined in claim 1 wherein said mass structure is of generally rectilinear block configuration and has a central longitudinal slot cut along the vertical axis from front to back downward to a predetermined depth to provide a vertical gap between said inertia members, and a pair of oppositely inclined diagonal slots cut from front to back at a predetermined angle relative to the vertical to provide gaps between the respective inertia members and said base member, and wherein said sensors are piezoresistive strain gauge elements;

a first pair of said piezoresistive strain gauge elements being disposed across said central longitudinal slot at opposite ends of said central slot on top of said mass;

a second pair of said piezoresistive strain gauge elements, one of said second pair respectively disposed across the other end of one of said diagonal slots, the other of said second pair of piezoresistive strain gauge elements disposed across the open end of the other of said diagonal slots;

a series of resistance elements interconnecting said first pair of piezoresistive strain gauge elements as opposite arms of a Wheatstone bridge circuit and also interconnecting said second pair of piezoresistive strain gauge elements as the remaining opposite arms of said bridge circuit;

a current source coupled to one of the diagonals of said Wheatstone bridge circuit; and an indicating device coupled to the opposite diagonal of said Wheatstone bridge circuit and responsive to the current from said source to indicate differences between respective piezoresistive strain gauge elements due to compressional and tensional forces thereon occurring when said mass structure is subjected to acceleration forces and the free ends of said block resulting from said slots move in response to said acceleration forces.

6. An accelerometer comprising:

a mass structure comprising a base member and a pair of inertia members, said structure comprising a block having a central longitudinal slot formed from front to back of the block along a plane that includes a predetermined axis, said central slot extending inwardly to a predetermined depth along said axis to provide a central gap between said two inertia members and having a pair of oppositely inclined slots also formed from front to back and at a predetermined angle relative to said plane on opposite sides thereof to provide inclined gaps between the respective inertia members and said base member; and a pair of piezoresistive members bridging the said inclined slots adjacent the outer ends thereof, each of said piezoresistive members being firmly connected to the base member and to said inertia members respectively on opposite sides of the respective inclined gaps.

7. An accelerometer comprising:

a mass structure comprising a base member and a pair of inertia members, said structure comprising a block having a central longitudinal slot formed from front to back of the block along a plane that includes a predetermined axis, said central slot extending inwardly along said axis to a predetermined depth to provide a central gap between said two inertia members and also having a pair of oppositely inclined slots also formed from front to back and at a predetermined angle relative to said plane on opposite sides thereof to provide inclined gaps between the respective inertia members and said base member; and means having an electrical property responsive to changes in the thickness of at least one of said slots as said accelerometer is subjected to acceleration along said predetermined axis for producing an electrical signal corresponding to the magnitude of said acceleration.

8. An accelerometer as defined in claim 7 including a pair of members elastically connected across said inclined slots adjacent the outer ends thereof.

9. An accelerometer as defined in claim 8 wherein said mass structure has been chamfered at angles perpendicular to said inclined slots, and said members are attached to said chamfered portion midway between the front and back of said mass structure.

10. An accelerometer as defined in claim 7 wherein the dihedral angles between each of said inclined slots and said central slot are obtuse angles.

11. An accelerometer as defined in claim 7 including an elastic member connected to said inertia members across said central slot adjacent the outer end thereof.

12. An accelerometer as defined in claim 7 wherein the portions of said block that lie between the inner end of said central slot and the inner ends of said inclined slots form a pair of flexural elements defining axes about which the respective inertia members are rotatable when the accelerometer is subjected to acceleration along said predetermined axis and wherein the centers of mass of each of the respective inertia members and said axes of rotation lie substantially in a common plane.

13. An accelerometer comprising:

a mass structure comprising a pair of inertia members resiliently mounted on a base member for rotation in opposite directions when the accelerometer is subject to acceleration along a predetermined sensitivity axis, extending through said mass structure, said mass structure being of generally rectilinear block configuration, and having a central longitudinal slot extending downward along said axis from front to back to a predetermined depth to form a gap between said inertia members, and a pair of inclined slots extending along lines from front to back at a predetermined angle relative to the vertical to provide gaps between said inertia members and said base member;

a first pair of piezoresistive strain gauge elements attachedly disposed across said central longitudinal slot at opposite ends of said slot on top of said mass structure; and a second pair of piezoresistive strain gauge elements respectively attachedly disposed across the open ends of the respective diagonal slots.

14. An accelerometer as defined in claim 13 wherein said mass structure has been chamfered at angles perpendicular to said first and said second slots, and said second pair of strain gauge elements are attached to said chamfered portions midway between the front and rear faces of said mass structure.

15. An accelerometer as defined in claim 13 wherein said strain gauge elements have similar mechanical properties and wherein said central slot has about half the length of each of said inclined slots whereby all four of said strain gauge elements are stressed by about equal amounts as said accelerometer is accelerated along said axis.

16. An acceleration measuring system comprising:

a mass structure having a central longitudinal slot cut along the vertical axis of said mass structure from front to back downward to a predetermined depth;

a first diagonal slot cut from front to back at a predetermined upward angle from the leftmost lower corner of said mass structure towards said central longitudinal slot for a length twice the depth of said longitudinal slot;

a second diagonal slot forming a mirror image of said first diagonal slot relative to a vertical plane, said second diagonal slot being cut into said mass beginning at the rightmost lower corner of said mass;

said slots forming a triangular base structure with a pair of relatively free laterally extending masses flexurally attached thereto;

a plurality of piezoresistive strain gauge elements disposed across predetermined end positions of said slots;

means including a source of electrical current, and an indicating device connected to the elements and responsive to compressional and tensional forces acting on said strain gauge elements when said mass structure is subjected to acceleration forces along said vertical axis for indicating acceleration.

17. An accelerometer comprising:

a mass supporting structure comprising a base member of generally pyramidal configuration and having a first wing-shaped mass member flexurally attached to one side of the apex of said base member and a second wing-shaped mass member flexurally attached to the other side of said apex, said mass structure being symmetrical about a midplane extending through said apex;

said mass members being separated from one another by a central longitudinal slot extending upwardly from said apex in the direction of said plane of symmetry;

said mass members being separated from said base member along the side below the apex thereof by a first inclined slot on one side of said base member twice as long as said central longitudinal slot and a second inclined slot forming a mirror image of said first diagonal slot relative to said plane of symmetry, said second diagonal slot being on the other side of said base member;

a first pair of piezoresistive strain gauge elements disposed across said central longitudinal slot, attached to opposite ends of said longitudinal slot on top of said wing-shaped masses;

a second pair of piezoresistive strain gauge elements, one of said second pair of piezoresistive strain gauge elements disposed across the open end of one of said diagonal slots, joining one of said wings and said base member, the other of said second pair of piezoresistive strain gauge elements disposed across the open end of the other of said diagonal slots, joining the other of said wings and said base member;

a series of resistance elements interconnected with said first and said second pairs of piezoresistive strain gauge elements to form the arms of a Wheatstone bridge circuit;

a source of electrical current coupled to one of the diagonals of said Wheatstone bridge circuit; and an indicating device coupled to the opposite diagonal of said Wheatstone bridge circuit and responsive to changes in balance of said bridge caused by changes in resistance of the respective piezoresistive strain gauge elements due to compressional and tensional forces acting on said strain gauge elements when said mass structure is subjected to acceleration forces along said vertical axis whereby said acceleration is indicated.

18. In an accelerometer:

a mass structure comprising a base member attachable to an object under investigation and a pair of inertia members rotatably mounted on said base structure and adapted to rotate in opposite directions when said base element is vibrated along a predetermined acceleration axis transverse to said hinge axes;

said mass structure being symmetrical about a plane that includes said acceleration axis, said mass structure having a central slot along said axis and separating said inertia members and a pair of slots inclined to said axis and separating each of said inertia members from said base member; and acceleration detecting means including displacement sensors controlled by changes occurring in the thickness of said slots as said accelerometer is subjected to acceleration for indicating the component of acceleration along said predetermined axis in preference to other components of acceleration.

19. In an accelerometer as defined in claim 18 wherein said sensors comprise four piezoresistive strain gauge elements, a first pair of said piezoresistive strain gauge elements being attached to said inertia members across either side of said central slot at opposite ends of said slot;

a second pair of said piezoresistive strain gauge elements being attached respectively across the open ends of said inclined slots.

20. An accelerometer as defined in claim 19 wherein each of said strain gauge elements is in the form of Euler column of smooth hourglass configurations having a reduced neck in which the strain is concentrated when the ends of the gauge are displaced from each other.

21. An accelerometer as defined in claim 20 in which said strain gauge elements have the same mechanical properties and wherein they are all subjected to equal stresses as the accelerometer is accelerated.

22. An accelerometer as defined in claim 20 wherein said acceleration detecting means comprises:

a series of electrical resistance elements interconnecting said piezoresistive strain gauge elements to form the arms of a Wheatstone bridge circuit; and a source of electric current signals coupled to one of the diagonals of said Wheatstone bridge circuit, and wherein said acceleration detecting means comprises an indicating device coupled to the opposite diagonal of said Wheatstone bridge circuit and responsive to changes in balance of said bridge caused by changes in resistance of the respective piezoresistive strain gauge elements due to compressional and tensional forces acting on said strain gauge elements when said mass structure is subjected to acceleration forces along said vertical axis whereby said acceleration is indicated.

References Cited

UNITED STATES PATENTS

| | | | |
|---|---|---|---|
| 2,907,560 | 10/1959 | Stedman | 73—516 |
| 3,196,668 | 7/1965 | McLellan | 73—88.5 |
| 3,206,984 | 9/1965 | Zuehlke | 73—516 X |

FOREIGN PATENTS 763,225  12/1956  Great Britain.

OTHER REFERENCES

An article entitled "An Accelerometer for Measuring Ship Hull Vibrations" by Boggis from "The Journal of Scientific Instruments," August 1950. (Copy in Group 430, 73-71.2.)